United States Patent
Utz et al.

(10) Patent No.: US 7,812,870 B2
(45) Date of Patent: Oct. 12, 2010

(54) COLOR SPACE CONVERSION IN THE ANALOG DOMAIN

(75) Inventors: Hubert Utz, Germering (DE); Detlef Schweng, Weinstadt-Schnait (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 1299 days.

(21) Appl. No.: 10/874,505

(22) Filed: Jun. 22, 2004

(65) Prior Publication Data

US 2005/0285955 A1 Dec. 29, 2005

(30) Foreign Application Priority Data

Jun. 14, 2004 (EP) .................................. 04392027

(51) Int. Cl.
- H04N 3/14 (2006.01)
- H04N 5/335 (2006.01)
- H04N 9/04 (2006.01)
- H04N 9/68 (2006.01)
- G09G 5/02 (2006.01)

(52) U.S. Cl. .................... 348/277; 348/273; 348/238; 345/604

(58) Field of Classification Search ................ 348/272, 348/273, 276, 277, 279, 281; 345/591, 604
See application file for complete search history.

(56) References Cited

U.S. PATENT DOCUMENTS 4,329,709 A  5/1982 Masuda et al. ............. 358/44

(Continued)

FOREIGN PATENT DOCUMENTS

EP  0 472299 A  2/1992

(Continued)

OTHER PUBLICATIONS

Carter, Bruce. "Handbook of Operational Amplifier Applications." TI Application Notes. Oct. 2001. <http://focus.ti.com/general/docs/techdocsabstract.tsp?abstractName=sboa092a>.*

(Continued)

*Primary Examiner*—John M Villecco
(74) *Attorney, Agent, or Firm*—Saile Ackerman LLC; Stephen B. Ackerman

(57) ABSTRACT

Systems and related methods have been achieved to convert in an analog domain the output of color image sensors into another color space. A chosen implementation converts the output of red, green, blue and white image sensors to the YcrCb color space, wherein the white image sensors are either extended dynamic range (XDR) image sensors or are of the same type as the other image sensors but have a larger size. The output of the white pixels can be used without conversion directly for the luminance Y value, thus achieving a very simple method for a conversion to YCbCr color space. Analog amplifiers, assigned to each of the red, green, and blue image sensors, have a gain according to the matrix describing the conversion from RGB to CbCr. Analog adders, assigned to Cb and Cr are adding the coefficients required for the computation of Cb and Cr. Finally the values of Y, Cb and Cr are converted to digital values. White pixels are advantageous but not required using the present invention. The present invention is also applicable for conversion to other color spaces as e.g. YIQ, YUV, CMYK, HIS, HSV, etc.

4 Claims, 3 Drawing Sheets

U.S. PATENT DOCUMENTS

| | | | | |
|---|---|---|---|---|
| 4,725,894 A | | 2/1988 | Sasaki et al. | 358/310 |
| 5,323,233 A | * | 6/1994 | Yamagami et al. | 348/277 |
| 5,577,178 A | * | 11/1996 | Curry et al. | 345/604 |
| 5,841,422 A | | 11/1998 | Shyu | 345/154 |
| 6,441,852 B1 | * | 8/2002 | Levine et al. | 348/302 |
| 6,456,325 B1 | | 9/2002 | Hayashi | 348/234 |
| 6,486,889 B1 | | 11/2002 | Meyers et al. | 345/604 |
| 6,714,243 B1 | * | 3/2004 | Mathur et al. | 348/273 |
| 7,400,332 B2 | * | 7/2008 | Schweng et al. | 345/589 |
| 7,414,630 B2 | * | 8/2008 | Schweng et al. | 345/589 |
| 2003/0035056 A1 | * | 2/2003 | Chen et al. | 348/273 |
| 2005/0248667 A1 | * | 11/2005 | Schweng et al. | 348/234 |
| 2006/0268302 A1 | * | 11/2006 | Chen et al. | 358/1.9 |

FOREIGN PATENT DOCUMENTS

| | | | |
|---|---|---|---|
| EP | 1 324621 A | | 7/2003 |
| EP | 1608183 A1 | * | 12/2005 |
| JP | 03234173 A | * | 10/1991 |
| JP | 4 267694 A | | 9/1992 |
| JP | 2003318375 A | * | 11/2003 |

OTHER PUBLICATIONS

Translation of JP 04-267694 A.*

Recommendation ITU-R BT.601.5, Studio Encoding Parameters of Digital Television for Standard 4:3 and Wide-Screen 16:9 Aspect Ratios, 1995.*

Co-pending U.S. Appl. No. DS-03-021, "Extended Dynamic Range in Color Imagers", Filed Jun. 3, 2004, U.S. Appl. No. 10/859,797, assigned to the same assignee.

* cited by examiner

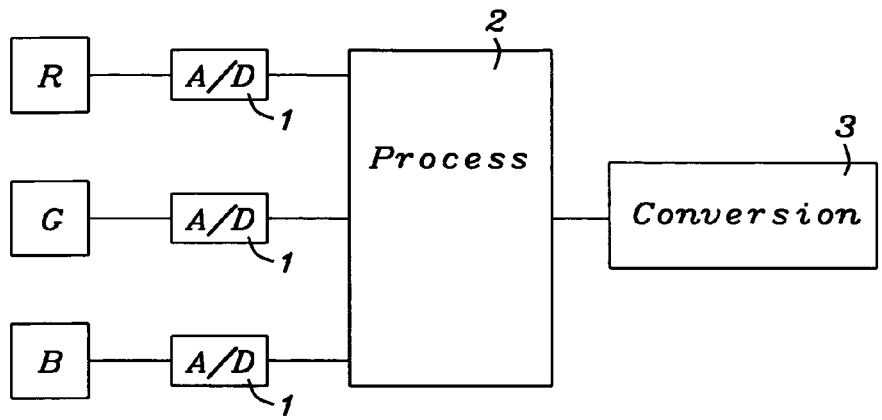
FIG. 1 — Prior Art
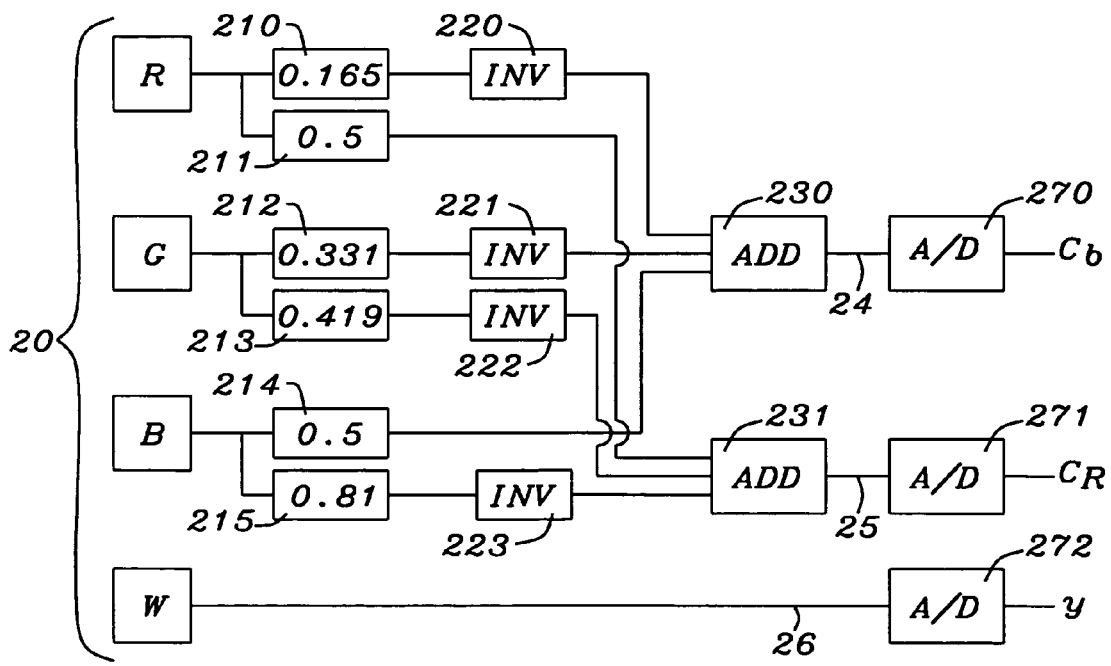
FIG. 2

COLOR SPACE CONVERSION IN THE ANALOG DOMAIN

RELATED PATENT APPLICATION

This application is related to U.S. patent application Ser. No. 10/859,797, filed Jun. 3, 2004 and assigned to the same assignee as the present invention.

BACKGROUND OF THE INVENTION (1) Field of the Invention

This invention relates generally to color space transformation of image sensors and relates more particularly to a transformation of analog signals from red, green, blue and white image sensors to values of another color space as e.g. YCbCr color space by a transformation in an analog domain.

(2) Description of the Prior Art

Color is the perceptual result of light in the visible region of the spectrum, having wavelengths in the region of 400 nm to 700 nm, incident upon the retina. The spectral distribution of light relevant to the human eye is often expressed in 31 components each representing a 10 nm band.

The human retina has three types of color photoreceptors cone cells, which respond to incident radiation with somewhat different spectral response curves. Because there are exactly three types of color photoreceptor, three numerical components are necessary and sufficient to describe a color, providing that appropriate spectral weighting functions are used. These cones provide the "photopic" vision.

Photoreceptors are not distributed evenly throughout the retina. Most cones lie in the fovea, whereas peripheral vision is dominated by rods. Rods handle the short wavelength light, up to about 510 nm. The number of rods is much higher than the number of cones. They are very sensitive to very low levels of light. These rods provide the "scotopic" vision. There is no color in scotopic vision and it is processed as grayscale.

Since the human eye has more photoreceptors handling black and white compared to colors luminance is more important to vision as colors.

Pixel values in accurate gray-scale images are based upon broadband brightness values. Pixel values in accurate color images are based upon tristimulus values. Color images are sensed and reproduced based upon tristimulus values, whose spectral composition is carefully chosen according to the principles of color science. As their name implies, tristimulus values come in sets of three. In most imaging systems, tristimulus values are subjected to a non-linear transfer function that mimics the lightness response of vision. Most imaging systems use RGB values whose spectral characteristics do not exactly match the tristimulus values of the human eyes.

A combination of real world physical characteristics determines what the human vision system perceives as color. A color space is a mathematical representation of these characteristics. Color spaces are often three-dimensional. There are many possible color space definitions.

Digital cameras have either RGB representation (RGB in one pixel), Bayer representation, wherein the pixels are arranged in a 2.times.2 cell having one red (R) pixel, one blue (B) pixel and two green (G) pixels, or having additionally white pixels as described in U.S. Ser. No. 10/859,797 filed: Jun. 3, 2004.

Usually different color spaces are being used to describe color images. YUV and YcbCr color spaces are getting more and more important.

The YUV color space is characterized by the luminance (brightness), "Y", being retained separately from the chrominance (color). There is a simple mathematical transformation from RGB: Y is approximately 30% Red, 60% Green, and 10% Blue, the same as the definition of white above. U and V are computed by removing the "brightness" factor from the colors. By definition, U=Blue−Yellow, thus U represents colors from blue (U>0) to yellow (U<0). Likewise V=Red−Yellow, thus V represents colors from magenta (V>0) to Cyan (blue green) (V<0)

The YCbCr color space was developed as part of recommendation CCIR601. YCbCr color space is closely related to the YUV space, but with the color coordinates shifted to allow all positive valued coefficients:

$$Cb=(U/2)+0.5$$

$$Cr=(V/1.6)+0.5,$$

wherein the luminance Y is identical to the YUV representation.

FIG. 1 prior art shows a typical configuration how to transform analog RGB signals to digital YCbCr signals. The analog signals of red (R), green (G) and blue (B) are being converted from analog to digital values by analog-to-digital converters 1. In the next block 2 the digital output of the converters 1 are being processed, this means, bad pixel correction, color boost, etc is performed. In block 3 a conversion from RGB to e.g. YCbCR signals is performed using a processor or the like.

The conversion from RGB to another color space is a complex and time-critical process. It is a challenge for the designers of digital color image system to provide a fast and simple means to perform such a transformation.

There are various patents known dealing with transformation to a color space such as YCbCr.

U.S. patent (U.S. Pat. No. 6,486,889 to Meyers et al.) describes an apparatus and methods in accordance with an exemplary embodiment of the invention to convert RGB video to at least one video output of Lab video, YCbCr video, with or without gamma correction, and Srgb video, with or without gamma correction. This conversion increases the flexibility of image information communication by enabling RGB video to be provided to a device that can only handle one of Lab, Srgb and/or YCbCr video.

U.S. patent (U.S. Pat. No. 6,456,325 to Hayashi) discloses an image signal-processing device including an RGB-YC conversion for converting color component signals output from a CCD (Charge Coupled Device) image sensor to luminance signals and components thereof lying in a high frequency range. The luminance signals and their components lying in a high frequency range are fed to a first, a second and a third low pass filter (LPF), respectively. Luminance signals output from a third LPF are fed to an adder while components lying in a high frequency range are fed from the first LPF to a selector. Further, the components output from the second LPF are fed to the selector via a resolution correcting section. The selector selects either one of the two different kinds of components input thereto. The adder adds the luminance signals output from the third LPF and the components selected by the selector and thereby outputs second luminance signals. A false signal reducing section reduces false signals contained in the second luminance signals and appearing at horizontal color boundaries and feeds the resulting luminance signals to a contour correcting section. With this configuration, the device is capable of reducing false signals appearing at horizontal color boundaries.

U.S. patent (U.S. Pat. No. 5,841,422 to Shyu) describes a method and an apparatus for reducing the number of matrix operations when converting digitized RGB color space signals to digitized YCbCr color space signals, at least two color difference signals, each being in terms of any two of the digitized RGB color space signals, are generated before performing first, second, third and fourth matrix multiplication operations of the color difference signals. The first and second matrix multiplication operations have first and second results to be used in conversion for the digitized Y color space signal. The third matrix multiplication operation has a third result to be used in conversion for the digitized Cb color space signal. The fourth matrix multiplication operation has a fourth result to be used in conversion for the digitized Cr color space signal.

SUMMARY OF THE INVENTION

A principal objective of the present invention is to achieve a system and a related method to convert the output of color image sensors to another color space in a cost-effective and fast way.

A further objective of the present invention is to achieve a system and a related method to convert the output of color image sensors to an YCbCr color space in a cost-effective and fast way.

In accordance with the objects of this invention a system to convert the output of color image sensors into another color space within an analog domain has been achieved. The system invented comprises, firstly, a configuration of color image sensors, a configuration of analog amplifiers and inverters having input and output, wherein the input of each amplifier is the output of one of said image sensors, the gain of each amplifier is set according to the coefficients of a conversion matrix describing the conversion from the color space of said image sensors to the destination color space and inverters are inverting the output of said amplifiers in case the correspondent coefficients of the conversion matrix are negative and wherein the output of the amplifiers or correspondently of the inverters is the input of a configuration of analog adders. Furthermore the system comprises a configuration of analog adders, wherein each of them is adding up the coefficients of one component of the destination color space, having an input and an output, wherein the input is the output of said amplifiers or inverters related to the correspondent component of the destination color space and the output are analog values of the destination color space, and a configuration of analog-to-digital converters having an input and an output wherein the input is the output of said analog adders and the output are digital values for each component of the destination color space.

In accordance with further objects of this invention a system to convert the output of image sensors to another destination color space within an analog domain has been achieved. Said system is comprising, firstly, a configuration of red, green, blue and white image sensors, wherein the output of the white image sensors represents the luminance Y and is connected directly to the input of analog-to digital converters and wherein each of said red, green and blue image sensors is connected to parallel analog amplifiers, wherein the number of said parallel analog amplifiers corresponds to the number of color coordinates of the destination color space, and a configuration of analog amplifiers and inverters having input and output, wherein the input of each amplifier is the output of one of said red, green or blue image sensors, the gain of each amplifier is set according to the coefficients of a conversion matrix describing the conversion from the RGB color space of said image sensors to the destination color space and inverters are inverting the output of said amplifiers in case the correspondent coefficients of the conversion matrix are negative and wherein the output of the amplifiers or correspondently of the inverters is the input of a configuration of analog adders. Furthermore the system is comprising a configuration of analog adders, wherein the number of the analog adders corresponds to the number of color coordinates of the destination color space and each of the analog adders is adding up the coefficients of one color coordinate of the destination color space, having input and output, wherein the input is the output of said amplifiers or inverters related to the correspondent component of the destination color space and the output are analog values of the destination color space, and a configuration of analog-to-digital converters having an input and an output, wherein the input of the analog-to-digital converters providing the color values of the destination color space is the output of the correspondent analog adder and the input of the analog-to-digital converter providing the luminance is the output of said white image sensor.

In accordance with further objects of the invention a system to convert the output of image sensors to YCbCr color space within an analog domain has been achieved. The system is comprising, firstly, a configuration of red, green, blue and white image sensors, wherein the output of the white image sensors represents the luminance Y and is connected to the input of analog-to digital converters and wherein each of said red, green and blue image sensors is connected to two parallel analog amplifiers. Furthermore the system comprises a configuration of six analog amplifiers and inverters, wherein a first analog amplifier, having a gain in the order of magnitude of 0.165, is connected to a red image sensor, a second amplifier, having a gain in the order of magnitude of 0.5 is connected to the red image sensor in parallel, a third analog amplifier, having a gain in the order of magnitude of 0.331, is connected to a green image sensor, a fourth amplifier, having a gain in the order of magnitude of 0.419 is connected to the green image sensor in parallel, a fifth analog amplifier, having a gain in the order of magnitude of 0.5, is connected to a blue image sensor, and a sixth amplifier, having a gain in the order of magnitude of 0.81 is connected to the blue image sensor in parallel. Additionally the system comprises a configuration of four analog inverters wherein a first inverter inverts the analog output of said first amplifier, a second inverter inverts the output of said third amplifier, a third inverter inverts the output of said fourth amplifier, and a fourth inverter inverts the output of said sixth amplifier, a configuration of two analog adders, wherein a first analog adder is adding the output of said first inverter, the output of said second inverter, and the output of said fifth amplifier and the output of said first adder is an analog signal of Cb, and wherein a second adder is adding the output of said second amplifier, the output of said third inverter, and the output of said fourth inverter and the output of said second adder is an analog signal of Cr, and a configuration of three analog-to-digital converters, wherein a first converter is converting the Cb signal, a second converter is converting the Cr signal, and a third converter is converting the output of said white image sensor representing the luminance Y.

In accordance with further objects of this invention a method to convert in an analog domain the color space of image sensors into another color space has been achieved. Said method comprises, firstly, providing image sensors, analog amplifiers, analog inverters analog adders and analog-to-digital converters. Further steps of the method invented are to amplify the output of the image sensors with correspondent gains of said analog amplifiers followed by adding all components belonging to each coefficient of the destination color space according to a correspondent conversion matrix to convert the values of the color space of the image sensors to the destination color space and to convert the values of the destination color space from analog to digital.

In accordance with further objects of this invention a method to convert the color space of image sensors within an analog domain to YCbCr color space has been achieved. The method invented comprises, firstly, providing red, green, blue and white image sensors, two analog amplifiers for each red, green, and blue image sensor, an analog inverter for each red and green amplifier providing the Cb coefficient, an analog inverter for each the blue and green amplifier providing the Cr coefficient, an analog adder for each the Cb and Cr coefficient and an analog-to-digital converter for each Y, Cb, and Cr coefficient of the destination color space. Further steps of the method are to get the Cb value by amplifying the output of red, green and blue image sensors using a gain of 0.169 for the red sensor, 0.331 for the green sensor, and 0.5 for the blue sensor and inverting the results of the amplification of the red and green values according to the equation Cb=−0.169×R−0.331×G+0.5×B, wherein R, G, and B are the output values of the correspondent red, green and blue image sensors and to get the Cr value by amplifying the output of red, green and blue image sensors using a gain of 0.5 for the red sensor, 0.419 for the green sensor, and 0.81 for the blue sensor and inverting the results of the green and blue values according to the equation Cr=0.5×R−0.419×G−0.81×B, wherein R, G, and B are the output values of the correspondent red, green and blue image sensors. The last two steps of the method invented are to get luminance value Y by using the output of the white image sensors unchanged as analog value of the luminance Y and to convert the analog values of Y, Cb, and Cr from analog to digital values.

BRIEF DESCRIPTION OF THE DRAWINGS

In the accompanying drawings forming a material part of this description, there is shown:

FIG. 1 prior art shows a system to convert RGB output to another color space.

FIG. 2 describes a preferred embodiment of a system to convert the output of red, green, blue, and white image sensors to YCbCr color space.

DESCRIPTION OF THE PREFERRED EMBODIMENTS

Figure 3:
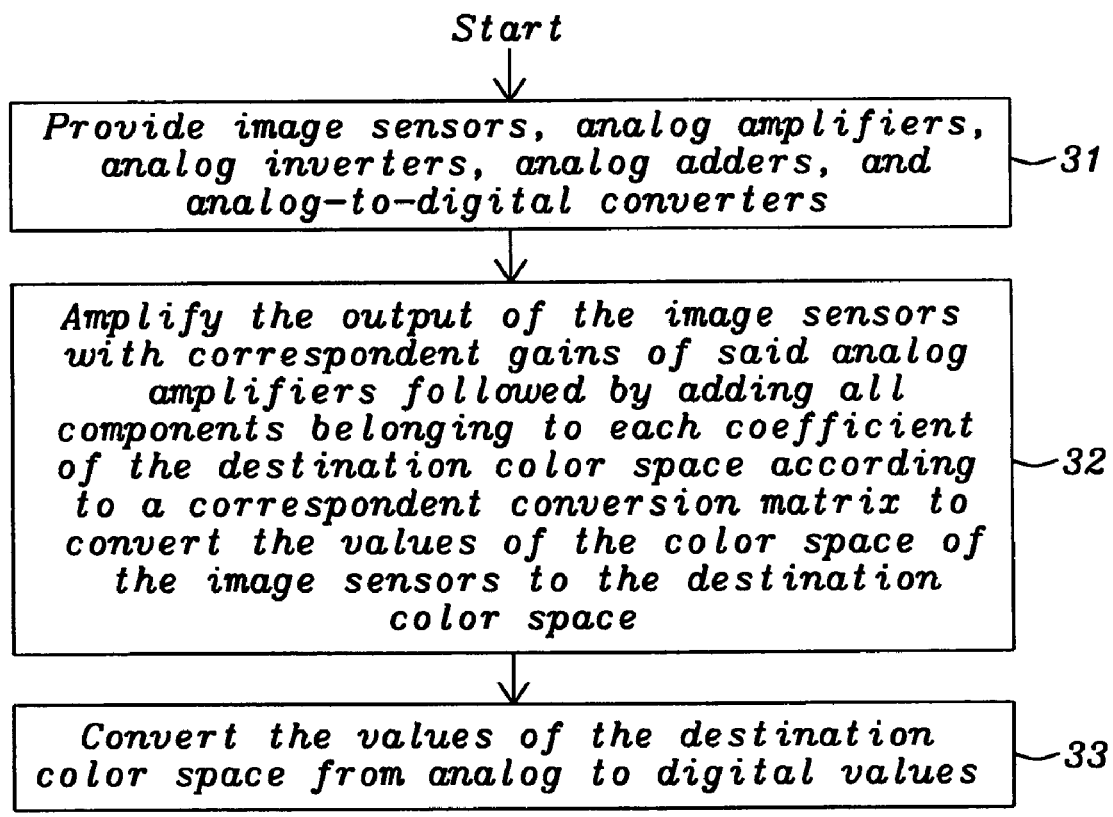
FIG. 3 illustrates a flowchart of the principal steps to convert in an analog domain the output of color image sensors to another color space.

The preferred embodiments disclose novel systems and methods to convert analog signals from image sensors in an analog domain to another color space as e.g. to YCbCr color space.

It has to be understood that a conversion to YCbCr is an example only. The systems and methods of the present invention enable a conversion from RGB to all color spaces allowing a conversion of the color values by a matrix or/and a vector operation like YIQ, YUV, CMYK, HIS, and HSV, etc.

The systems and methods of the present invention enable a very fast and cost-effective transformation. In a preferred embodiment a configuration of red, green, blue and white image sensors have been used as disclosed in the U.S. patent application Ser. No. 10/859,797 filed: Jun. 3, 2004 and assigned to the same assignee as the present invention. The invention is applicable to video images as well as to still images of a digital camera.

There is a well-known equation to transform pixel data from RGB to YcbCr color space:

$$\begin{bmatrix} Y \\ Cb \\ Cr \end{bmatrix} = \begin{bmatrix} 0.299 & 0.587 & 0.114 \\ -0.169 & -0.331 & 0.5 \\ 0.5 & -0.81 & -0.81 \end{bmatrix} \times \begin{bmatrix} R \\ G \\ B \end{bmatrix}, \quad (1)$$

wherein R, G, B are the values of Red, Green and Blue as components of the RGB color space, and Y is the luminance and Cb and Cr are the color values as components of the YcbCr color space.

FIG. 2 shows a preferred embodiment of the invention. The chosen implementation shows a conversion to YCbCr format wherein the image sensors are deployed having an "extended" Bayer representation using red (R), green (G), blue (B) and white (W) image sensors 20 as shown in U.S. Ser. No. 10/859,797 filed: Jun. 3, 2004. The white image sensors (W) used could be of the extended dynamic range (XDR) type having the same size as the other RGB image sensors or could be of the same type as the other RGB image sensors but having a larger size than the RGB sensors.

In a preferred embodiment all components of the system invented are implemented on one integrated circuit (IC).

Using an "extended" Bayer representation the white image sensors already yield the luminance value Y of the YcbCr color space. Therefore the transformation from the RGB to YcbCr color space is easier and faster to be performed. The luminance Y is already provided by the white pixel, the color values Cb and Cr can be achieved according to the following equation, derived from equation (1):

$$\begin{bmatrix} Cb \\ Cr \end{bmatrix} = \begin{bmatrix} -0.169 & -0.331 & 0.5 \\ 0.5 & -0.419 & -0.81 \end{bmatrix} \times \begin{bmatrix} R \\ G \\ B \end{bmatrix}, \quad (2)$$

The transformation of the RGB values to Cb and Cr values is performed in an analog domain using standard blocks of analog amplifiers 210 to 215 and, in case the coefficients shown in equation (2) are negative, standard blocks of inverters 220 to 223. The gain of the analog amplifiers, shown in analog amplifier blocks 210 to 215 of FIG. 2, is adjusted according of the coefficients of the equation (2) shown above. In case these coefficients of equation (2) are negative, standard blocks of inverters 220 to 223 are deployed to convert the output of the analog amplifiers 210, 212, 213 and 215 into correspondent negative analog signals. Analog adders 230 and 231 are deployed to get the analog values for Cb 24 and Cr 25. The output of the white pixels can be used unchanged to get the analog value of luminance Y 26. Analog-to-digital converters 270, 271, and 272 convert the analog values of Cb, Cr, and Y to digital values for further processing. In a preferred embodiment operational amplifiers have been implemented for the amplifiers 210 to 215. The inverters 220 to 223 could be integrated into the correspondent amplifiers. It is obvious that any other amplifying and inverting means could be used for that purpose.

The circuit of FIG. 2 illustrates how the value for e.g. Cb is achieved. According to equation (1) the value of Cb is achieved using the equation:

$$Cb = -0.169 \times R - 0.331 \times G + 0.5 \times B, \quad (3)$$

wherein R, G and B are the output values of the correspondent red, green, and blue image sensors.

In order to get the value of Cb the output of the red (R) image sensor is multiplied by the factor 0.165 according to equation (3) by the analog amplifier 210, inverted by the analog inverter 220 into a correspondent negative value and used as an input for the analog adder 230. The output of the green (G) image sensor is multiplied by the factor 0.331 according to equation (3) by the analog amplifier 212, inverted by the analog inverter 221 into a correspondent negative value and used as an input for the analog adder 230. The output of the blue (B) image sensor is multiplied by the factor 0.5 according to equation (3) by the analog amplifier 214 and used as an input for the analog adder 230. The adder 230 is adding the output of the inverters 220 and 221 and from amplifier 214. The result yields an analog value of Cb 24 and is then converted to a digital value of Cb by the analog-to digital converter 270.

The value of Cr is achieved correspondently as the analog value of Cb derived from equation (1) according to:

$$Cr = 0.5 \times R - 0.419 \times G - 0.081 \times B \tag{4}$$

wherein R, G and B are the output values of the correspondent red, green, and blue image sensors.

In order to get the value of Cr the output of the red (R) image sensor is multiplied by the factor 0.5 according to equation (3) by the analog amplifier 211 and used as an input for the analog adder 231. The output of the green (G) image sensor is multiplied by the factor 0.419 according to equation (4) by the analog amplifier 213, inverted by the analog inverter 222 into a correspondent negative value and used as an input for the analog adder 231. The output of the blue (B) image sensor is multiplied by the factor 0.81 according to equation (4) by the analog amplifier 215, inverted by the analog inverter 223 into a correspondent negative value and used as an input for the analog adder 231. The adder 231 is adding the output of the inverters 222 and 223 and from amplifier 211. The result yields an analog value of Cr 25 and is then converted to a digital value of Cr by the analog-to digital converter 271.

The analog value 26 of the luminance Y is taken unchanged from the output of the white sensor W. For further processing it is converted to a digital value by the analog-to digital converter 272.

The systems and methods invented can be applied to conventional RGB image, that means without white sensors as well. It is obvious that a similar circuit could be used to get a value for luminance Y in case no white image sensors would be deployed. Derived from equation (1) the value of the luminance Y could be achieved according to the equation:

$$Y = 0.229 \times R + 0.587 \times G + 0.114 \times B \tag{5}$$

wherein R, G and B are the output values of the correspondent red, green, and blue image sensors. In this case three more analog amplifiers would be required, correspondent to the coefficients for red, green and blue and an additional analog adder. Since in equation (5) all coefficients are positive, no inverters would be required. This demonstrates the advantages of using white pixels as disclosed in U.S. Ser. No. 10/859,797 filed: Jun. 3, 2004. Said additional three analog amplifiers and an analog adder are not required if white image sensors are used to get a value of luminance Y.

The key point of the present invention is the conversion from RGB to color values of another color space in an analog domain. In case that white pixels are used the amount of analog processing is significantly reduced and the conversion is even more cost-effective.

FIG. 3 describes the principal steps of a method to convert the output values of image sensors providing signals of a source color space to values of a destination color space wherein the conversion is performed in an analog domain. The first step 31 comprises the provision of image sensors, analog amplifiers, analog inverters, analog adders and analog-to digital converters. The following step 32 describes how the analog values of the destination color space are achieved by amplifying the output of the image sensors with correspondent gains of said analog amplifiers followed by adding all components belonging to each coefficient of the destination color space according to a correspondent conversion matrix to convert the values of the color space of the image sensors to the destination color space. The last step 33 describes the conversion of the values of the destination color space from analog to digital values.

Figure 4:
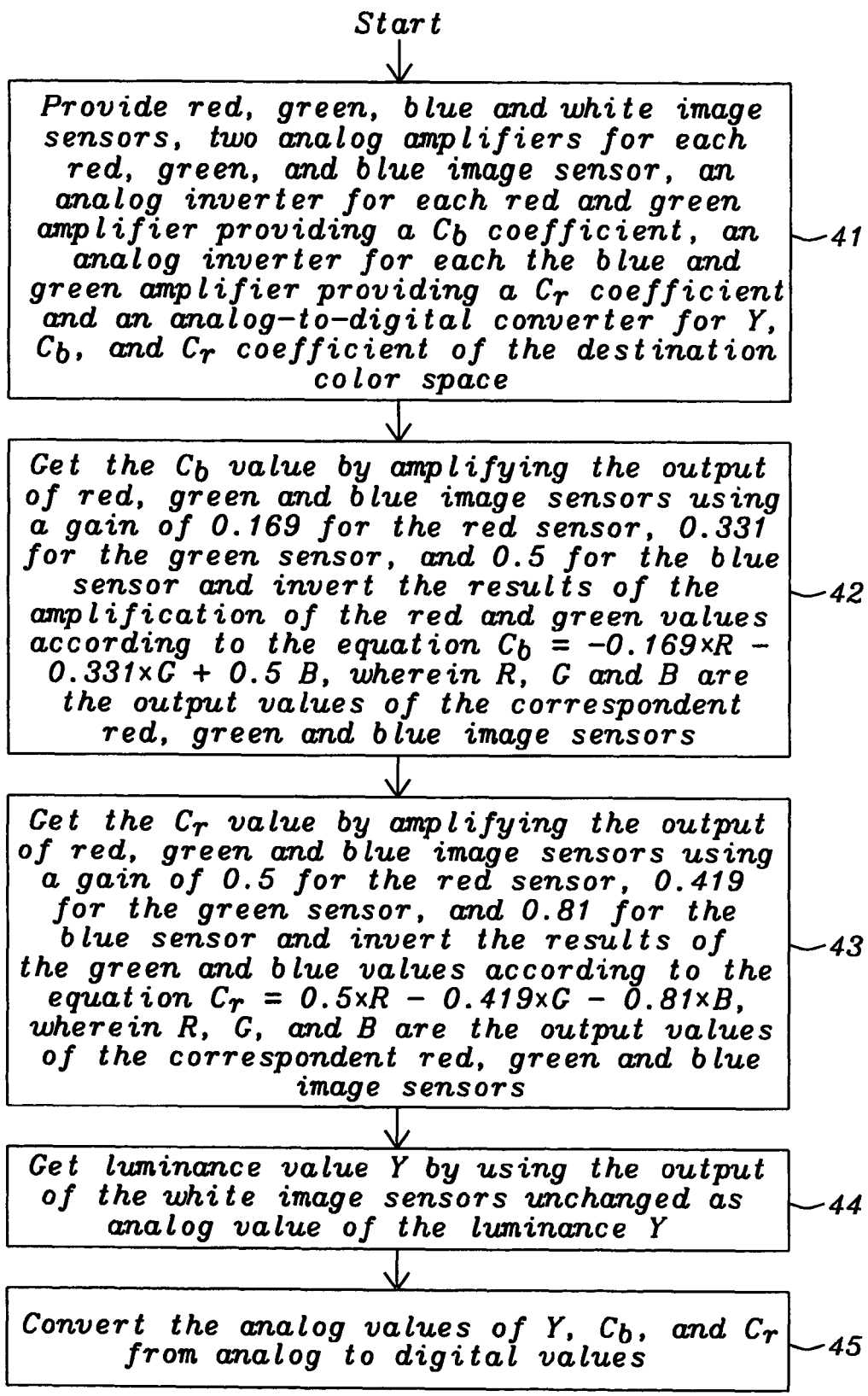
FIG. 4 shows a flowchart of a method to convert in an analog domain the output of red, green, blue and white pixels into YCbCr color space.

A chosen implementation of the general method described in FIG. 3 is illustrated in more detail in FIG. 4. This preferred embodiment describes a method to get YCbCr values from a configuration of red, blue, green and white pixels as described in U.S. Ser. No. 10/859,797 filed: Jun. 3, 2004 and assigned to the same assignee as the present invention.

Step 41 illustrates the provision of red, green, blue and white image sensors, two analog amplifiers for each red, green, and blue image sensor, an analog inverter for each red and green amplifier providing a Cb coefficient, an analog inverter for each the blue and green amplifier providing a Cr coefficient, an analog adder for each the Cb and Cr coefficient and an analog-to-digital converter for each Y, Cb, and Cr coefficient of the destination color space.

Step 42 describes how to get the Cb value by amplifying the output of red, green and blue image sensors using a gain of 0.169 for the red sensor, 0.331 for the green sensor, and 0.5 for the blue sensor and inverting the results of the amplification of the red and green values according to the equation $$Cb = -0.169 \times R - 0.331 \times G + 0.5 \times B,$$

wherein R, G, and B are the output values of the correspondent red, green and blue image sensors.

Step 43 illustrates how to get the Cr value by amplifying the output of red, green and blue image sensors using a gain of 0.5 for the red sensor, 0.419 for the green sensor, and 0.081 for the blue sensor and inverting the results of the green and blue values according to the equation $Cr = 0.5 \times R - 0.419 \times G - 0.081 \times B$, wherein R, G, and B are the output values of the correspondent red, green and blue image sensors.

Step 44 shows how to get the luminance value Y by using the output of the white image sensors unchanged as analog value of the luminance Y. In step 45 the analog values of Y, Cb and Cr are converted from analog to digital values for further processing.

In case only red, green and blue image sensors would be used (without white sensors), the same method as described above could be used except step 44 would have to be modified. In this case the value of luminance Y is achieved by amplifying the output of red, green and blue image sensors using a gain of 0.229 for the red sensor, 0.587 for the green sensor, and 0.114 for the blue sensor according to the equation $Y = 0.229 \times R + 0.587 \times G + 0.114 \times B$, wherein R, G, and B are the output values of the correspondent red, green and blue image sensors.

It has to be understood that in an implementation of the present invention the amplification factors can slightly differ from the coefficients of the matrix shown without any serious impact on the quality of the images converted.

In summary, the advantage of the present invention is to achieve a very cost-effective and fast conversion of the output of image sensors to color spaces as e.g. YCbCr color space.

While the invention has been particularly shown and described with reference to the preferred embodiments thereof, it will be understood by those skilled in the art that various changes in form and details may be made without departing from the spirit and scope of the invention.

What is claimed is:

1. A system to convert the output of red, green, blue and white image sensors to YCbCr color space within an analog domain comprising:
a configuration of red, green, blue and white image sensors, wherein only said white image sensors are extended dynamic range (XDR) image sensors and wherein the output of the white image sensors represents the luminance Y and is connected to the input of a correspondent analog-to digital converter and wherein each of said red, green and blue image sensors is connected to two parallel analog amplifiers;
a configuration of six analog amplifiers, wherein a first analog amplifier, having a gain in the order of magnitude of 0.169, is connected to a red image sensor, a second amplifier, having a gain in the order of magnitude of 0.5 is connected to the red image sensor in parallel, a third analog amplifier, having a gain in the order of magnitude of 0.331, is connected to a green image sensor, a fourth amplifier, having a gain in the order of magnitude of 0.419 is connected to the green image sensor in parallel, a fifth analog amplifier, having a gain in the order of magnitude of 0.5, is connected to a blue image sensor, and a sixth amplifier, having a gain in the order of magnitude of 0.081 is connected to the blue image sensor in parallel;
a configuration of four analog inverters wherein a first inverter inverts the analog output of said first amplifier, a second inverter inverts the output of said third amplifier, a third inverter inverts the output of said fourth amplifier, and a fourth inverter inverts the output of said sixth amplifier;
a configuration of two analog adders, wherein a first analog adder is adding the output of said first inverter, the output of said second inverter, and the output of said fifth amplifier and the output of said first adder is an analog signal of Cb, and wherein a second adder is adding the output of said second amplifier, the output of said third inverter, and the output of said fourth inverter and the output of said second adder is an analog signal of Cr; and
a configuration of three analog-to-digital converters wherein a first converter is converting the Cb signal, a second converter is converting the Cr signal, and a third converter is converting the output of said white image sensor representing the luminance Y.

2. The system of claim 1 wherein said white image sensors are larger than the red, green, and blue image sensors used.

3. A method to convert the output of red, green, blue and white image sensors within an analog domain to YCbCr color space comprising:
providing red, green, blue and white image sensors, wherein only said white image sensors are extended dynamic range (XDR) image sensors, two analog amplifiers for each red, green, and blue image sensor, an analog inverter for each red and green amplifier providing the Cb coefficient, an analog inverter for each the blue and green amplifier providing the Cr coefficient, an analog adder for each the Cb and Cr coefficient and an analog-to-digital converter for each Y, Cb, and Cr coefficient of the destination color space;
get the Cb value by amplifying the output of red, green and blue image sensors using a gain of 0.169 for the red sensor, 0.331 for the green sensor, and 0.5 for the blue sensor and inverting the results of the amplification of the red and green values according to the equation $Cb=-0.169 \times R - 0.331 \times G + 0.5 \times B$, wherein R, G, and B are the output values of the correspondent red, green and blue image sensors;
get the Cr value by amplifying the output of red, green and blue image sensors using a gain of 0.5 for the red sensor, 0.419 for the green sensor, and 0.81 for the blue sensor and inverting the results of the green and blue values according to the equation $Cr=0.5 \times R - 0.419 \times G - 0.81 \times B$, wherein R, G, and B are the output values of the correspondent red, green and blue image sensors;
get luminance value Y by using the output of the white image sensors unchanged as analog value of the luminance Y; and
convert the analog values of Y, Cb, and Cr from analog to digital values.

4. The method of claim 3 wherein said white image sensors are larger than the red, green, and blue image sensors used.

* * * * *